Figure 1:
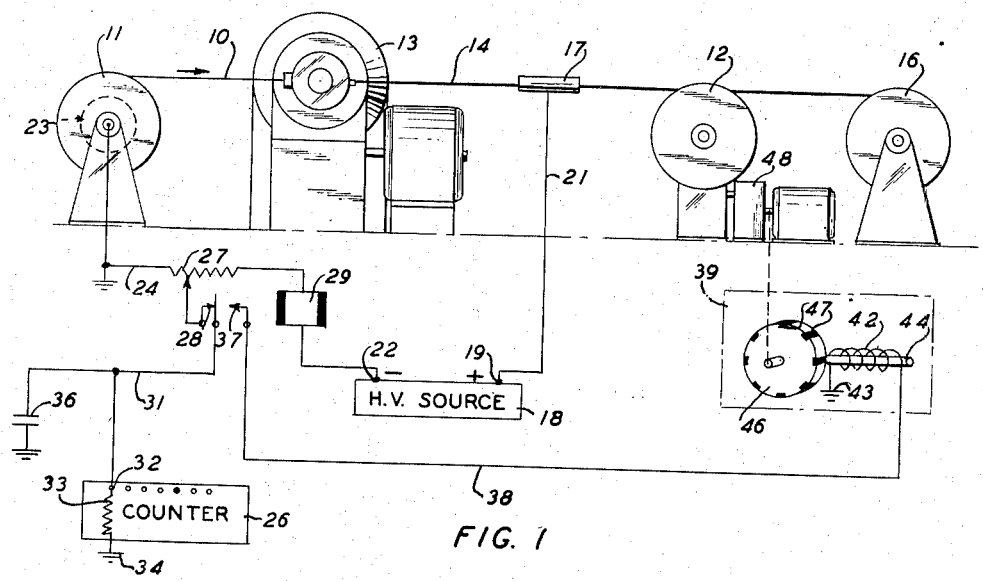

July 7, 1959  R. D. GAMBRILL  2,894,204
INSULATION TESTING APPARATUS
Filed Oct. 21, 1957

INVENTOR.
R. D. GAMBRILL
BY
ATTORNEY

United States Patent Office 2,894,204
Patented July 7, 1959

2,894,204

INSULATION TESTING APPARATUS

Richard D. Gambrill, Idlewylde, Md., assignor to Western Electric Company, Incorporated, New York, N.Y., a corporation of New York Application October 21, 1957, Serial No. 691,507

4 Claims. (Cl. 324—54)

This invention relates to apparatus for testing the continuity of the insulation on an insulated wire, and more particularly to insulation testing apparatus capable of giving an indication for every fault in the insulation and also capable of giving a plurality of indications proportional to the length of a fault longer than a preselected length.

In the manufacture of communications cable, it is frequently necessary to test the continuity of the insulation on an insulated wire, or on a plurality of insulated wires associated together, as in a twisted pair of insulated wires or a multiconductor cable.

A limited number of minor faults in the insulation, which are faults shorter than a preselected length, may be tolerated. Such minor faults, sometimes termed "pinhole" faults, may be caused by tiny voids in the insulation or by the presence of minute conductive foreign particles in the insulation. The insulated wire must, however, be rejected if more than a limited number of the minor "pinhole" faults are present, and, therefore, it is advantageous to provide apparatus for indicating the total number of such minor faults.

Sections of the insulated wire containing major faults, which are faults longer than the preselected length referred to above, such as where the insulation is slitted or stripped from the wire, must be rejected. The dividing line between a minor fault and a major fault may be set, in accordance with the expected use of the insulated wire, at a certain preselected length, for example one thirty-second of an inch.

An object, therefore, of the invention is to provide an improved apparatus for testing the continuity of the insulation on an insulated wire.

Another object of the invention is to provide insulation testing apparatus capable of giving an indication for every fault in the insulation and also capable of giving a plurality of indications proportional to the length of a fault longer than a preselected length.

Apparatus for testing the continuity of the insulation on an insulated wire, embodying certain features of the invention, may include means for applying a test potential between portions of the insulation and the conductor, and means for causing relative movement between the test potential applying means and the portions of the insulation to which the test potential is applied. Means are provided, associated normally with the test potential applying means and responsive to a pulse of current between the insulation and the wire, for indicating a fault in the insulation.

An independent pulse generator is provided having a pulsing frequency proportional to the rate of relative movement between the test potential applying means and the portions of the insulation to which the test potential is applied, and means are provided, responsive to a fault in the insulation longer than a preselected length, for disassociating the fault indicating means from the test potential applying means and for associating the fault indicating means with the independent pulse generator.

With this arrangement, the fault indicating means will give an indication for every fault in the insulation and also will give a plurality of indications proportional to the length of a fault longer than the preselected length.

Figure 2:
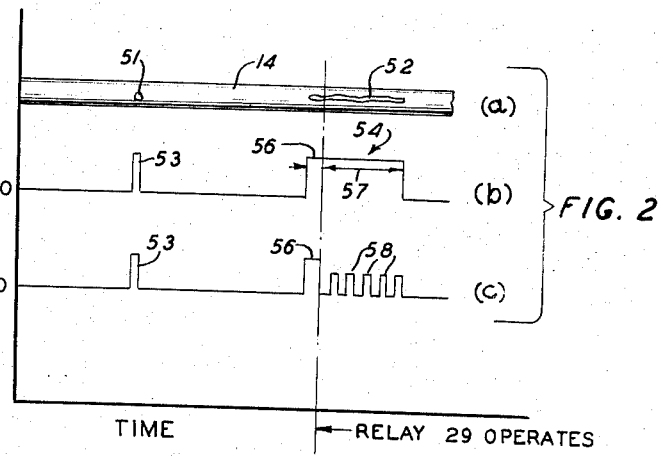

Other objects and advantages of the invention will appear from the following detailed description of a specific embodiment thereof, when read in conjunction with the appended drawings, in which:

Fig. 1 is a diagrammatic view of insulation testing apparatus according to the invention and showing manufacturing apparatus with which it may be used, and Fig. 2(a) is a graphical representation of various types of faults which may occur in an insulated conductor, and Figs. 2(b) and 2(c) indicate corresponding wave forms extant at various points in the insulation testing apparatus shown in Fig. 1.

Referring now in detail to the drawings, and in particular to Fig. 1, the insulation testing apparatus is shown in conjunction with a conventional extrusion unit for insulating wire. With this extrusion unit, a bare wire 10 is withdrawn continuously from a supply reel 11 by a capstan 12, and is advanced thereby through a conventional plastics extruder 13. The extruder 13 supplies a continuous coating of plastic insulation material, for example polyethylene, about the bare wire 10 to form an insulated wire 14. The insulated wire 14 passes out of the extruder 13, around the driving capstan 12, and is taken up on a take-up reel 16.

In order to test the continuity of the insulation applied by the extruder 13, a test electrode 17 is provided, through which the insulated wire 14 passes prior to engagement with the driving capstan 12. The electrode 17 may comprise a short hollow cylinder of conductive material through which the insulated wire 14 is advanced.

A suitable source of test potential 18 is connected to the test electrode 17. For testing polyethylene insulated wire, the test potential source 18 should apply approximately 6,000 to 8,000 volts D.C. between the insulation and the bare wire 10. The positive terminal 19 of the high voltage source 18 is connected over a suitable conductor 21 to the test electrode 17.

Portions of the bare wire 10 to be insulated are connected in a suitable manner to the negative terminal 22 of the high voltage source 18 to form a testing circuit. Since the supply reel 11 is normally metallic, it may be grounded, thus grounding the inner end 23 of the bare wire 10. The negative terminal 22 of the source 18 may then be grounded through a return conductor 24 to the supply reel 11.

If a discontinuity or fault in the insulation occurs at any point along the length of the continuously advancing insulated wire 14, the testing circuit will be completed and a pulse of current will flow from the positive terminal 19 of the high voltage source 18, over the conductor 21 to the test electrode 17, through the fault in the insulation, along the bare wire 10 within the insulated wire 14 to the end 23 thereof, to the ground-extending supply reel 11, thence over the return conductor 24 to the negative terminal 22 of the high voltage source 18.

Suitable means are provided, associated normally with the test circuit, for indicating or counting the number of faults encountered. The preferred counting means comprise a conventional electronic decade counter 26, which may be connected across a portion of a resistance 27 in circuit with the return conductor 24, through a normally closed contact 28 of a switching relay 29, and over a conductor 31 to the input 32 of the electronic counter 26.

A pulse of current over the conductor 24, indicating a fault in the insulation, is registered by the counter 26 in a well-known manner, passing through an initial resistance 33 thereof to ground 34. The counter 26 will count once for each pulse of current over the conductor 24, indicating a fault in the insulation, but, in and of itself, it will not distinguish between major and minor faults. The electronic counter 26 is preferably shunted by a grounded pulse shaping capacitor 36 to insure only one count thereof, even with an irregular pulse over the conductor 24.

The switching relay 29 is connected between the return conductor 24 and the negative terminal 22 of the high voltage source 18, and has a slower response time than that of the counter 26. The switching relay 29 is preferably a delayed-action relay, the delay time of which is regulated in accordance with the speed of advancement of the insulated wire 14, so that the switching relay 29 will be energized whenever the fault is longer than a preselected length, which preselected length may correspond to what is deemed a major fault.

The relay 29 will be energized, whenever the fault is longer than the preselected length, to open, either directly as shown or through mesne circuits, the normally closed contact 28 to disconnect the counter 26 from the testing circuit. Obviously, the switching relay 29 might be provided with additional contacts (not shown) for energizing a warning light or other signal indicating the presence of a major fault in the insulation.

To provide a quantitative indication of the length of such a major fault in the insulation, the switching relay 29, when energized, also acts to close a contact 37 to connect the counter 26, over a conductor 38, to an independent pulse generator, indicated generally by the numeral 39. The pulse generator 39 is designed for generating a series of pulses having a frequency proportional to the speed of advancement of the insulated wire 14 through the electrode 17.

The pulse generator 39 supplies a succession of pulses to the counter 31, one pulse for each predetermined unit length of continuously faulty insulation. It can be seen that the pulse counter 26, as connected normally in the testing circuit, counts once for every fault in the insulation and, when switched by the relay 29 to connect with the pulse generator 39, counts an additional number of times for a major fault proportional to the total length thereof.

A particular pulse generator 39 suitable for use with the invention is shown within phantom lines at the lower-right of Fig. 1. The conductor 38 is connected through a pickup coil 42 to ground 43. The pickup coil 42 is disposed about a magnet 44, and the magnet 44 is positioned closely to a rotating disc 46 of nonmagnetic material, having a plurality of iron slugs 47—47 secured at spaced intervals around the periphery thereof.

The disc 46 is rotated through suitable gearing 48 at a speed directly proportional to the rotational speed of the capstan 12 and, thus, at a speed directly proportional to the speed of advancement of the insulated wire 14. As successive iron slugs 47—47 are rotated past the magnet 44, they will alter the magnetic field thereof and thus induce in the pickup coil 42 a succession of pulses of a frequency proportional to the speed of advancement of the insulated wire 14. The iron slugs 47—47 are so spaced that the interval between successive pulses corresponds to a predetermined unit length of insulated wire, for example two inches.

Operation

In operation, the bare wire 10 is advanced by the capstan 12 from the supply reel 11 through the extruder 13, whereat a continuous coating of a suitable insulating material, such as polyethylene, is applied about the bare wire 10 to form the insulated wire 14. The insulated wire 14 is advanced through the hollow cylindrical test electrode 17 whereat it is tested, and then the tested, insulated wire passes around the driving capstan 12 and is taken up on the take-up reel 16.

When the insulation about the bare wire 10 is satisfactory, no current will flow in the testing circuit, since the potential applied by the high voltage source 18 between the insulation and bare wire 10 is not sufficient to permit current to pass through the insulation to the bare wire 10. However, when a fault occurs in the insulation passing the test electrode 17, the testing circuit will be established as follows: from the positive terminal 19 of the high voltage source 18 and over the conductor 21 to the test electrode 17; through the particular fault in the insulation, along the bare wire 10 within the insulated wire 14 to the inner end 23 thereof, and to the ground-extending supply reel 11; thence over the return conductor 24, across the resistance 27, and through the switching relay 29 to the negative terminal 22 of the high voltage source 18.

A circuit will be completed at substantially the same time to the counter 26 as follows: from the return conductor 24 across a portion of the resistance 27; through the normally closed contact 28 of the switching relay 29, and over the conductor 31 to the input 32 to the counter 26; thence through the initial resistance 33 of the counter 26 to ground 34.

Fig. 2(a) represents graphically two particular kinds of faults which may occur in the insulated wire 14, and which are distinguishable with the improved testing apparatus; Fig. 2(b) illustrates the current pulses over the return conductor 24, induced by the faults shown in Fig. 2(a); and Fig. 2(c) represents the resultant input to the counter 26 in the particular example.

Fig. 2(a) represents a section of insulated wire 14 under test, having a relatively minor "pinhole" fault 51 in the insulation, shorter than the preselected length differentiating a minor fault from a major fault, which length may be set, for example, at one thirty-secondth of an inch. The same section of insulated wire 14 also contains a major fault 52 in the insulation, illustrated as a slitted portion 10 inches long.

As the faults 51 and 52 pass in succession through the test electrode 17, a short pulse 53 and then a relatively long pulse, designated generally by the numeral 54, are induced in the conductor 24, the current flow being zero at all other times, as illustrated in Fig. 2(b).

The short pulse 53, caused by the "pinhole" fault 51, is not of sufficient duration to operate the delayed-action switching relay 29. However, the short pulse 53 is long enough, when applied over the conductor 31 to the counter 26, as represented in Fig. 2(c), to induce a single count of the quick-acting electronic decade counter 26. Thus, one "pinhole" fault is indicated by the counter 26, since the output thereof consists of a single count.

An initial portion 56 of the relatively long pulse 54, induced by the major fault 52, is applied over the conductors 24 and 31, as illustrated in Figs. 2(b) and 2(c), respectively, to the counter 26 thereby inducing a first count indicating that a fault is present.

The first portion 56 of the long pulse 54 is equal in duration to the delay time of the switching relay 29, so that a continuing portion 57 of the pulse 54 energizes the switching relay 29, which opens the contact 28 and closes the contact 37. The counter 26 is thereby disconnected from the return conductor 24 of the testing circuit through the opening of the contact 28, and is connected to the independent pulse generator 39 through the conductor 38 and the newly closed contact 37.

The pulse generator 39 is synchronized in a suitable manner with the speed of advancement of the insulated wire 14 to apply a succession of pulses 58—58 to the counter 26, as represented in Fig. 2(c). The interval between successive pulses 58—58 is designed to be proportional to a predetermined unit length of insulated wire advancing through the test electrode, for example two inches.

The counter 26 will thus register a series of counts corresponding to the number of input pulses 58—58 applied thereto, thus indicating the length of the major fault 52 in the insulation. In the above example the interval between successive pulses 59—59 corresponded to two inches of insulated wire 14 and the slitted portion of the insulation comprising the major fault 52 was 10 inches long, thus the counter 26 produces five output counts in addition to the initiating count.

As the end of the major fault 52 passes the electrode 17, the current in the testing circuit drops to zero and the switching relay 29 is deenergized to open the contact 37 to disconnect the counter 26 from the independent pulse generator 39 and to reclose the contact 28 to reconnect the counter 26 to the return conductor 24.

It will be manifest that this invention is not limited to the specific details described in connection with the above embodiment of the invention and that various modifications may be made without departing from the spirit and scope thereof.

For example, while the invention has been shown in the testing of a single insulated wire moving through a stationary testing electrode, it is obvious that the electrode might move along a stationary insulated wire to be tested, the only requirement being relative motion between the two.

The expression "insulated wire," as used in the specification and the appended claims, is intended to encompass a single strand of insulated wire as shown in the drawings, or a plurality of strands associated together such as a twisted pair of insulated wires or a multiconductor cable.

What is claimed is:

1. Apparatus for testing the continuity of the insulation on an insulated wire, which comprises means for applying a test potential between portions of the insulation and the wire, means for causing relative movement between said test potential applying means and the portions of the insulation to which the test potential is applied, a pulse counter associated normally with said test potential applying means and responsive to a pulse of current between the insulation and the wire for indicating a fault in the insulation, independent means for generating a series of pulses of a frequency proportional to the rate of relative movement between said test potential applying means and the portions of the insulation to which the test potential is applied, and means responsive to a fault in the insulation longer than a preselected length for disassociating said pulse counter from said test potential applying means and for associating said pulse counter with said independent pulse generating means, whereby said pulse counter counts once for every fault in the insulation and counts an additional number of times proportional to the length of a fault longer than the preselected length.

2. Apparatus for testing the continuity of the insulation on an insulated wire, which comprises an electrode positioned in proximity to portions of the insulation to be tested, a source of test potential, a testing circuit for connecting said source of test potential between said electrode and the wire so that a pulse of current flows in the testing circuit in the event of a fault in the insulation, means for causing relative movement between said electrode and the portions of the insulation to which said electrode is applied, a pulse counter connected normally in said testing circuit and responsive to a pulse of current therein for indicating a fault in the insulation, an independent pulse generator having a pulsing frequency proportional to the rate of relative movement between said electrode and the portions of the insulation to which said electrode is applied, and a switching relay connected in said testing circuit and having a slower response time than that of said pulse counter designed for switching the connection of said pulse counter from said testing circuit to said independent pulse generator, whereby said pulse counter counts once for every fault in the insulation and counts an additional number of times proportional to the length of a fault extending for a longer time than the response time of said switching relay.

3. Apparatus for testing the continuity of the insulation on an insulated wire, which comprises an electrode positioned in proximity to portions of the insulation to be tested, a source of test potential, a testing circuit for connecting said source of test potential between said electrode and the wire so that a pulse of current flows in the testing circuit in the event of a fault in the insulation, means for causing relative movement between said electrode and the portions of the insulation to which said electrode is applied, a pulse counter connected normally in the testing circuit and responsive to a pulse of current therein for indicating a fault in the insulation, an independent pulse generator having a pulsing frequency proportional to the rate of relative movement between said electrode and the portions of the insulation to which said electrode is applied, and a delayed-action switching relay connected in said testing circuit and energizable after the passage of a preselected length of faulty wire for switching the connection of said pulse counter from said testing circuit to said independent pulse generator, whereby said pulse counter counts once for every fault in the insulation and counts an additional number of times proportional to the length of a fault longer than the preselected length.

4. Apparatus for testing the continuity of the insulation of an advancing insulated wire, which comprises a hollow electrode through which the insulated wire advances, a source of test potential, a testing circuit for connecting said source of test potential between said electrode and the wire so that a pulse of current flows in the testing circuit in the event of a fault in the insulation, a pulse counter connected normally in said testing circuit and responsive to a pulse of current therein for indicating a fault in the insulation, an independent pulse generator having a pulsing frequency proportional to the speed of advancement of the insulated wire, and a delayed-action switching relay connected in said testing circuit the delay time of which is regulated in accordance with the speed of advancement of the insulated wire so as to be energizable by a fault longer than a preselected length for switching the connection of said pulse counter from said testing circuit to said independent pulse generator, whereby said pulse counter counts once for every fault in the insulation and counts an additional number of times proportional to the length of a fault longer than the preselected length.

References Cited in the file of this patent

UNITED STATES PATENTS 1,938,684   Bond et al. _____ Dec. 12, 1933